(12) United States Patent
Jenkins

(10) Patent No.: US 8,881,625 B2
(45) Date of Patent: Nov. 11, 2014

(54) HIGH SPEED, HIGH TORQUE SCREW FASTENERS AND DRIVE SYSTEMS

(76) Inventor: Robert Jenkins, Kaaawa, HI (US)

( * ) Notice: Subject to any disclaimer, the term of this patent is extended or adjusted under 35 U.S.C. 154(b) by 272 days.

(21) Appl. No.: 13/311,246

(22) Filed: Dec. 5, 2011

(65) Prior Publication Data

US 2013/0139657 A1    Jun. 6, 2013

(51) Int. Cl.
  *B25B 15/00*   (2006.01)
  *B25B 23/00*   (2006.01)
  *B25B 23/02*   (2006.01)
  *F16B 23/00*   (2006.01)

(52) U.S. Cl.
  USPC ............... 81/429; 81/451; 81/460; 411/403; 411/404; 411/406

(58) Field of Classification Search
  USPC ............ 81/429, 436, 438, 451, 460; 411/403, 411/404, 406
  See application file for complete search history.

(56) References Cited

U.S. PATENT DOCUMENTS

| | | |
|---|---|---|
| 132,946 A | 11/1872 | Armstrong |
| 1,296,165 A | 3/1919 | Costuma |
| 1,797,390 A | 3/1931 | Wood |
| 1,997,422 A | 4/1934 | Lorenzen et al. |
| 2,182,092 A | 12/1939 | O'Leary |
| 2,304,704 A | 12/1942 | O'Leary |
| 2,677,985 A | 5/1954 | Vaughn |
| 2,684,094 A | 7/1954 | Lissy |
| 2,745,120 A | 5/1956 | Vaughn |
| 2,792,039 A | 5/1957 | Wing et al. |
| 3,026,920 A | 3/1962 | York |
| 3,120,251 A | 2/1964 | York |
| 3,354,481 A | 11/1967 | Bergere |
| 3,695,321 A | 10/1972 | Garehime, Jr. |
| 4,190,091 A * | 2/1980 | Colognori ..................... 81/453 |
| 4,311,071 A | 1/1982 | Bassell |
| 4,538,486 A * | 9/1985 | Lutrat ............................. 81/460 |
| 4,625,598 A * | 12/1986 | Wolfram ........................ 81/436 |
| 5,269,209 A * | 12/1993 | Baker ............................. 81/436 |
| 5,353,667 A | 10/1994 | Wilner |
| 5,438,895 A | 8/1995 | Bassell et al. |
| 6,755,836 B1 | 6/2004 | Lewis |
| 7,165,482 B2 * | 1/2007 | Shapoval ....................... 81/451 |
| 7,311,026 B2 * | 12/2007 | Melton .......................... 81/436 |
| 2008/0034930 A1* | 2/2008 | Landes et al. .................. 81/436 |
| 2012/0090435 A1* | 4/2012 | Dauletbayev .................. 81/436 |

FOREIGN PATENT DOCUMENTS

| | | |
|---|---|---|
| DE | 10612 | 1/1880 |
| DE | 20208490 U1 | 10/2002 |
| GB | 2367104 A | 3/2002 |
| RU | 2036782 C1 | 6/1995 |
| RU | 2064857 C1 | 8/1996 |
| RU | 2356724 C2 | 1/2008 |

* cited by examiner

*Primary Examiner* — David B Thomas
(74) *Attorney, Agent, or Firm* — Kelly & Kelley, LLP

(57) ABSTRACT

A fastener system including a threaded fastener having a slot formed in the fastener head. Facets are formed in the slot walls, each facet having an angle of less than ninety degrees with respect to the base of the slot such that the slot has a variable width and at least a portion of the width of the base is greater than the width of the opening of the slot. A driver bit includes a blade configured to be inserted into the slot of the fastener. At least a portion of the free end of the blade has an increased width such that the blade is locked within the slot of the fastener when torque is applied to the driver bit.

24 Claims, 7 Drawing Sheets

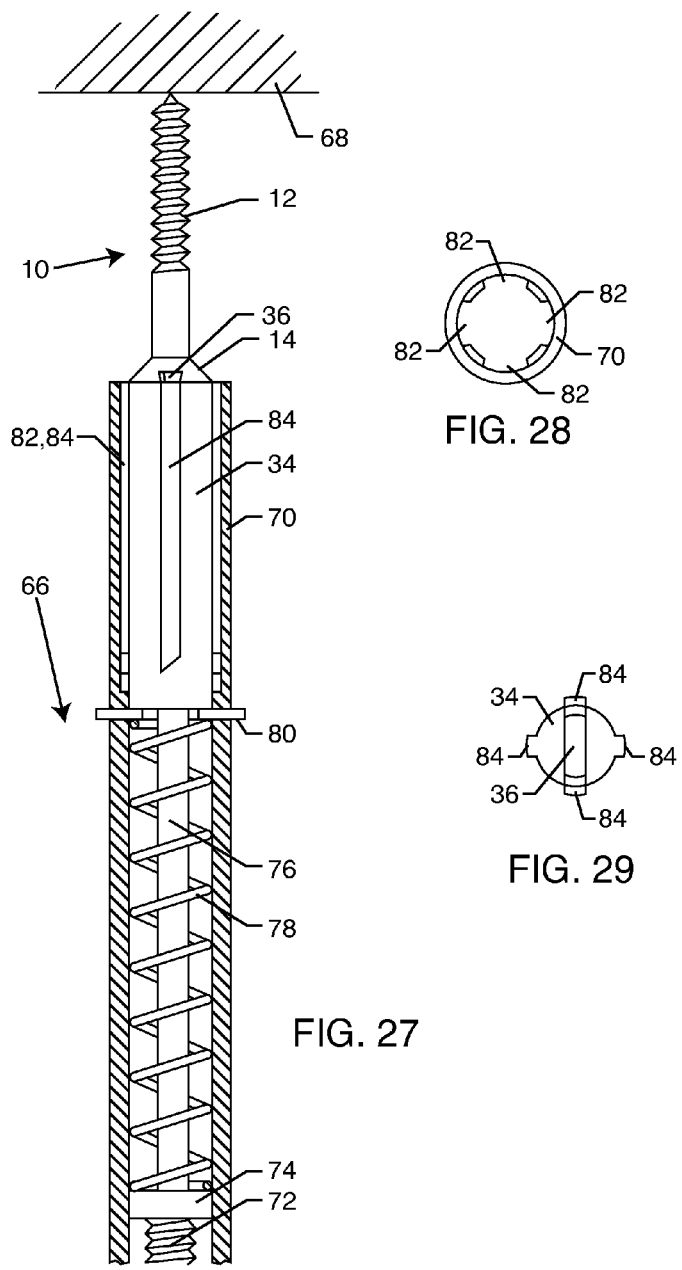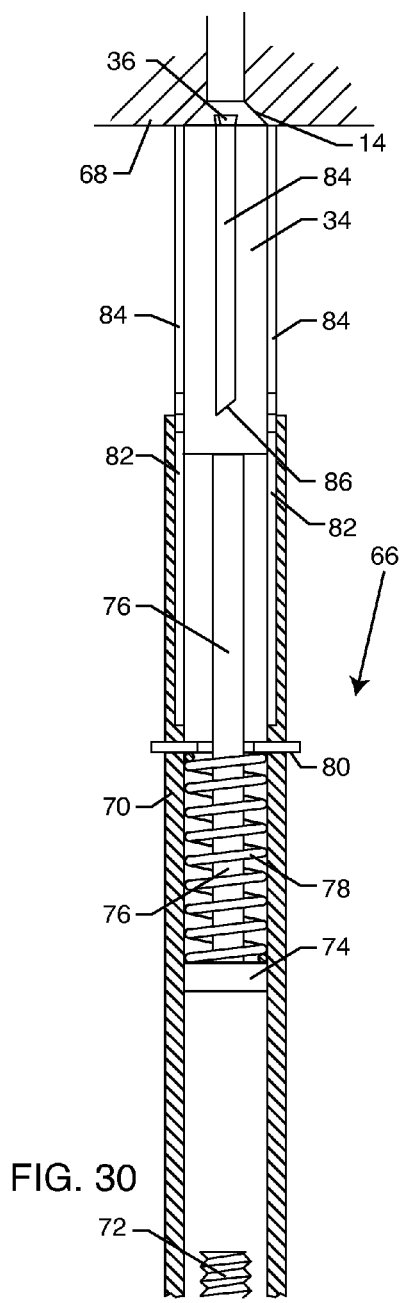

HIGH SPEED, HIGH TORQUE SCREW FASTENERS AND DRIVE SYSTEMS

BACKGROUND OF THE INVENTION

The present invention generally relates to fasteners and driving systems. More particularly, the present invention relates to a high speed, high torque screw fastener having faceted or undercut walls such that a corresponding driver bit is locked in engagement therewith when torque is applied to the driving bit.

The prior art is replete with various forms of designs of drive systems where typically a fastener head includes a recess while a driver bit is provided with a complimentary shaped projection for insertion into the recess. One common such system, as illustrated in FIG. 1, for fasteners, such as screws and bolts, is the formation of a generally uniform slot 2 formed across the diameter of the fastener head 4. The driving blade 6 of a regular or flat screwdriver or driving bit which has a diameter at a free end or tip thereof which is slightly less than the diameter of the slot 2 is inserted into the slot and torque applied thereto in order to turn and drive the fastener.

However, this arrangement has several drawbacks. As can be seen in FIG. 1, the points of engagement 8 between the driver blade 6 and the fastener head 4 are at opposite extreme ends of the driver blade 6. It is very easy for the driver blade 6 to slip out, sometimes referred to as cam out, of engagement with the slot 2 during operation. This is particularly the case when applying high torque or attempting to drive the fastener with increased speed. Moreover, in high torque or high speed situations, the driver blade 6 and/or the walls of the slot 2 can be damaged.

There are other well known fastener drive systems which include different configurations of the recess formed in the fastener head. For example, such systems include a cruciform-type system often referred to as Phillips, internal hex, internal square, internal star and Torx™ configurations. However, these configurations also experience cam out and the edges of the recesses or the drill bits can become deformed or otherwise damaged in high torque or high speed applications. Thus, these screw head and driver systems require lower twisting torque because higher torque would cause the fastener head or driver to deform or break. This can limit the size of the fastener or the type of fastener head used, and whether the fastener is countersunk into a material.

For example, conical or wedge shaped screw heads are more likely to "pull through" the material, such as wood, drywall and other soft materials. Although a common or pan head screw having a flat underside surface would be preferable, existing fasteners and drive systems are unable to withstand the high torque necessary to countersink such fasteners in the material.

In another example, hex head screws or bolts are typically used in metal fastening applications in which flat or conehead screws or bolts, which can be countersunk, would be preferred, but cannot be used simply because the weakness of the screw head and driver head systems currently used do not permit them to be tightened to the required high tightening torques. The screw or bolt head, or the driver head, will break under these higher torques.

In addition, existing fasteners and drive systems require the operator to apply strong downward forces on the tool to maintain the contact between the fastener head and the driver as the fastener is being installed or removed, which can result in broken tools and fasteners, as well as operator discomfort and possible long-term injury.

The use of power tools to install common wood screws or machine bolts has become widespread. Many industries utilize automatic-feed tools, in which a supply of screws or bolts on a strip or in a magazine is automatically delivered to the power tool, or totally automated factory assembly line systems, in which the screw or bolt is automatically fed and installed by tooling. In the construction industry, because of the speed of the powered tooling and the benefits of using screws, and with the increasing use of metal studs to replace conventional wood studs, screws are replacing traditional nails. However, as described above, current screw head and driver design severely limit the speed and the amount of twisting force or torque that can be used in installing or removing these screws or bolts with powered tooling.

Accordingly, there is a continuing need for an improved fastener and driver system which reduces or eliminates slip out or cam out. There is also a continuing need for such a fastener and driving system which can withstand high speeds and high torque applied thereto. There is further a need for such a fastener and driving system which can be used in connection with power tools, including automatic-feed tools, and which does not require large downward forces. The present invention fulfills these needs, and provides other related advantages.

SUMMARY OF THE INVENTION

The present invention resides in an improved fastener system. The system includes a high speed, high torque fastener. The fastener comprises a first end defining a threaded portion and a second end including a fastener head. A slot is formed in the head which includes generally opposed first and second walls defining an insertion opening.

The first wall has two faceted portions, each having angles of less than ninety degrees with respect to the base of the slot. The two faceted portions are separated by a generally perpendicular central portion relative to the base of the slot. Similarly, the second wall has two faceted portions, each having angles of less than ninety degrees with respect to the flat base of the slot, the two faceted portions being separated by a generally perpendicular central portion relative to the base of the slot.

The base of the slot has a variable width, at least a portion of the width of the base being greater than the width of the insertion opening. A generally dovetail cross-sectional configuration is formed at each end of the slot.

Preferably, each of the faceted portions of the first and second walls has a generally trapezoidal configuration. Each of the central portions of the first and second walls has a generally truncated triangular configuration.

A central top portion of a top edge of the first wall and a central portion of a top edge of the second wall are generally parallel to one another. A top edge of the first wall and a top edge of the second wall at each end of the slot defined by the faceted portions diverge away from one another, such that the slot is parallel-sided near the center, and flares outward in straight lines at both ends. These flared sections, with their associated angled planes defined by the facets are the locking surfaces of the slot.

A second slot of similar configuration may be formed in the head of the fastener. The first and second slots may cross one another.

A driver bit of the fastener system has a blade configured to be inserted into the slot of the fastener. The blade extends from a driver head of the driver bit to a free end. Typically, the driver bit head defines a generally planar surface from which the blade extends. At least a portion of the free end of the blade has a width greater than the width of the blade at the driver head, such that the blade is locked within the slot of the fastener when torque is applied to the driver bit and the side edges of the blade contact a faceted portion of each of the first and second walls.

A projection may extend from the blade, which is configured for insertion into a recess formed in the head of the fastener. The driver head may include one or more magnets embedded therein.

Generally opposite ends of the driver blade may have a configuration corresponding to at least a portion of a periphery of the fastener head.

The driver bit may be associated with a guide. The guide includes a collar which moves independent of the driver bit from a biased advanced position to a retracted position.

The driver bit may alternatively be associated with a clutching and de-clutching mechanism. The driver bit includes an elongated spline extending along less than a length of the driver bit. The spline is engaged with a groove of a tube of the clutching and de-clutching mechanism during a length of travel of the driver bit relative to the tube. However, the spline disengages from the groove beyond the length of travel of the driver bit relative to the tube. Moreover, the driver bit may include a plunger generally opposite the blade under spring tension to bias the driver bit within the tube. Means are provided for limiting the travel of the driver bit relative to the tube. When the spline disengages from the groove at a length of travel of the driver bit corresponding to a length of the fastener such that the clutching and declutching mechanism declutches when the fastener has been driven its full length.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 27 is a partially sectioned diagrammatic view of a tool having a clutching and de-clutching mechanism, in accordance with the present invention;

FIG. 28 is an end view of a driving tube of the tool of FIG. 27;

FIG. 29 is an end view of a driver bit of the present invention used in connection with the tool of FIG. 27; and FIG. 30 is a partially sectioned view similar to FIG. 27, illustrating a fastener driven into material in accordance with the present invention.

DETAILED DESCRIPTION OF THE PREFERRED EMBODIMENTS

As shown in the accompanying drawings, for purposes of illustration, the present invention resides in a new and improved fastener and related fastener system. The fastener and fastener system of the present invention overcome many drawbacks currently experienced with existing fasteners. Moreover, the fastener of the present invention can be fastened and removed to materials at high speeds and using high torque forces.

Figure 2:
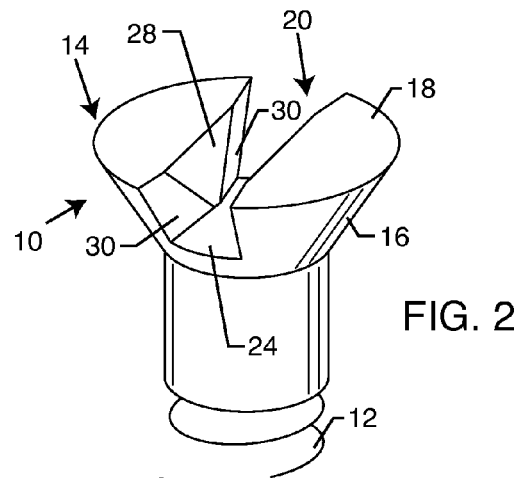
FIG. 2 is a fragmented perspective view of a fastener embodying the present invention.

With reference now to FIG. 2, a fragmented perspective view of a fastener 10 embodying the present invention is illustrated. The fastener 10 includes a threaded portion 12 generally at one end thereof and a fastener head 14 at a generally opposite end thereof. The fastener illustrated in FIG. 2 is of a common wood screw type with a flat or cone headed screw head 14. As such, the outer periphery 16 of the fastener head 14 is generally sloped or conical in shape. A top surface 18 of the head 14 is generally planar or flat.

With continuing reference to FIG. 2, in accordance with the present invention, a slot 20, for insertion of a blade of a driver bit as will be more fully described herein, is formed in the fastener head 14. The slot 20 includes an insertion opening 22 and a base 24 and opposed walls 26 generally defining the slot 20.

Figure 4:
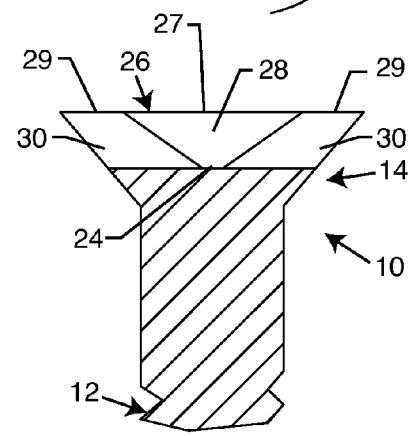
FIG. 4 is a cross-sectional view taken generally along 4-4 of FIG. 3.

As can be seen in FIG. 2, the walls 26 are faceted. Each wall 26 of the slot 20 comprises a vertical portion 28 which is generally perpendicular with respect to the base 24 of the slot. As can be seen in FIGS. 2 and 4, the perpendicular central portion 28 is of a generally triangular configuration, and more particularly not coming to a point at the base 24 so as to form a truncated triangular configuration. Facets 30 are formed on each slot wall 26 on either side of the generally perpendicular portion 28, as illustrated in FIGS. 2 and 4. The facets 30 are formed at a slight angle of less than ninety degrees in relation to the flat plane of the base 24 of the slot 20. As can be seen in the various figures, in a particularly preferred embodiment the facets 30 are of a trapezoidal configuration.

Figure 3:
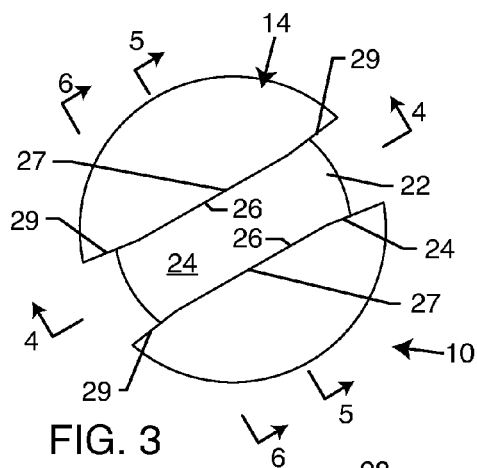
FIG. 3 is a top view of the fastener of FIG. 2.
Figure 5:
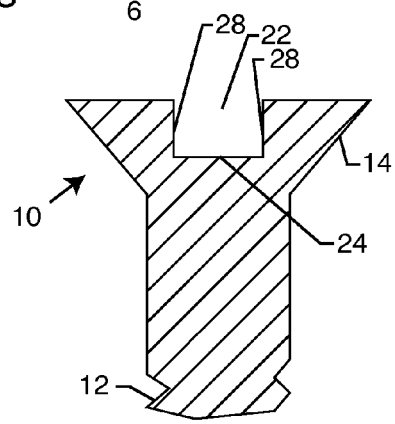
FIG. 5 is a cross-sectional view taken generally along line 5-5 of FIG. 3.
Figure 6:
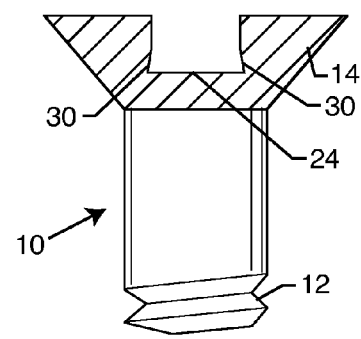
FIG. 6 is a cross-sectional view of the fastener taken generally along line 6-6 of FIG. 3.

This will be understood with a viewing of the cross-sectional views illustrated in FIGS. 3-6. FIG. 3 illustrates a top view of the fastener 10 of FIG. 2. FIG. 4 is a cross-sectional view taken generally along line 4-4 of FIG. 3. This illustrates a particularly preferred embodiment in which each wall 26 has a generally central portion 28 which is normal to the base 24 and is bounded on either side by a facet 30 at the ends of the slot 20. It can be seen in the top view of FIG. 3 that the upper edge portion 27 and the central facets 28 are generally parallel to one another. However, the top edges 29 defined by the facets 30 are flared away from one another so as to diverge away from one another at each end of the slot 20. In a particularly preferred embodiment, each wall 26 of the fastener 10 has a similar arrangement. Thus, viewing FIG. 5, the cross-sectional view taken generally along line 5-5 of FIG. 3 shows that the central portion 28 of the walls 26 are generally normal with respect to the base 24. When the fastener 10 is positioned as illustrated in FIG. 5, such portions 28 are vertical with respect to the generally horizontal base 24 of the slot. FIG. 6 is a cross-sectional view of the fastener 10 taken generally along line 6-6 of FIG. 3. This cross-sectional view is taken along a plane halfway between the center of the slot 20 and the extreme periphery, at which point the central vertical portion 28 of the slot walls 26 are partially undercut at the bottom by angled facets 30.

Figure 7:
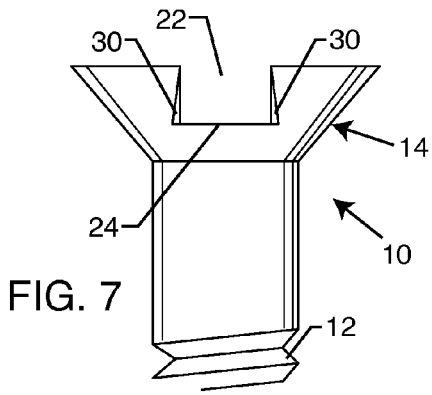
FIG. 7 is a side view of the fastener of FIG. 2.

Thus, the slot 20 has an insertion opening 22 between the central portions 28 of a first diameter. The base 24 of the slot is of a variable width. The width of the base 24 between the perpendicular or vertical portions 28 is the same as the width of the insertion opening 22 of the slot. However, the width of the base of the slot 24 is greater at the faceted portions 30 thereof, as illustrated in FIGS. 6 and 7. In the preferred embodiment, where the walls 26 of the slot 20 include faceted portions 30 at each end thereof, a generally dovetail cross-sectional configuration is created, as illustrated in FIGS. 2 and 4.

With reference again to FIGS. 6 and 8, in a particularly preferred embodiment the faceted portion 30 is formed in the shape of a trapezoid, wherein at the end thereof from the base 24 to the insertion opening 22 of the slot 20 a slight angle is formed. However, as one progresses inward towards the center of the slot there is a portion which is generally perpendicular to the base 24, and as such can be considered part of the perpendicular portion 28 of the slot wall.

Figure 8:
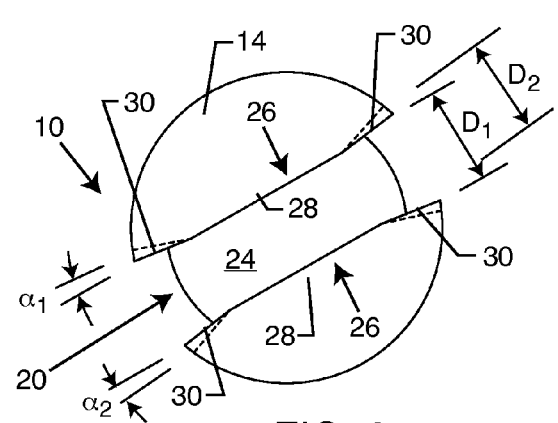
FIG. 8 is a diagrammatic view illustrating the formation of faceted undercuts, in accordance with the present invention.

With reference now to FIG. 8, one method of forming the multifaceted slot of the present invention is illustrated. The slot 20 is formed by first cutting a straight, perpendicular or vertical-walled slot in the screw head 14, similar to that of a common straight screw slot. Typically, the slot is wider than a common straight screw slot. This width, which corresponds to the insertion opening 22 and the distance between generally perpendicular portions 28 is represented by arrows $D_1$. The fastener 10 is then rotated about a slight angle $\alpha_1$ in reference to a line parallel to the center line of the straight slot. The perpendicular walls of the straight slot are slightly undercut from end to end using a slightly narrower cut represented by the lines $D_2$. This forms a faceted portion 30 on generally opposite and extreme ends of the walls 26. The fastener head 14 is then rotated slightly again past the centerline at angle $\alpha_2$, and a cut is formed therein slightly less than the insertion opening 22 cut so as to form the other faceted portions 30. The faceted portions 30 are represented by the dotted lines in FIG. 8. The dovetailed undercut portions are not parallel to the longitudinal axis of the slot. They are formed at slight angles to the longitudinal axis, flaring outward along straight lines to the ends of the slot. The result is the configuration illustrated in FIGS. 2-7. The flared end sections, defined by the facets 30, with their associated angled planes are the locking surfaces of the slot 20. As will be described more fully herein, they mate to corresponding dovetailed recesses in a unique driver blade.

The rotation of the head 14 of the fastener 10 slightly past opposite sides of a center line and forming cuts in the opposite direction in a straight slot so as to create the facets and undercuts is but one process for forming the unique configuration of the present invention. The invention is not limited to such. Another example of the method in which the multifaceted slot of the present invention can be formed is by means of existing cold-forming methods of manufacturing. The special screw slot of the present invention is initially formed "opened up" or "unfolded". That is, in the initial forming operation of the fastener head, the head is formed such that the top surfaces of the head, on either side of the slot, are formed bent back at a slight angle relative to the base of the slot. This results in the internal facets of the slot being bent back through a slight angle while maintaining the same relationship to each other as in the finished part. This initial forming can be performed by an appropriately shaped forming tool or die, pressing upon the unformed metal from above. In a next stage, the slot is "closed" or "folded" by a tool or a die or by an appropriately formed part of thread rolling dies. For example, the sides of the head on opposite sides of the slot are bent back through an equivalent angle to the opening angle, such that the top surfaces 18 are now parallel to the base 24 of the slot 20 and the facets 28 and 30 of the slot are in their final, finished position, as illustrated in FIG. 2.

Regardless of the method of forming the fastener 10 of the present invention, the following geometrical description of the slot 20 applies. The slot 20 is formed by the intersection of a standard, straight-sided and flat-bottom screw slot of cuboid shape with an imaginary wedge-shaped isosceles triangular prism of corresponding length, pointing upward, the height of the prism being greater than the depth of the slot, the width of the base of the imaginary triangular prism being slightly less than the width of the standard slot such that it can freely enter the standard slot from above. In every angle and dimension, the bottom end of the triangular prism slot 20 is designed to mate with a driver blade 36 on a driver head 34, as illustrated in FIGS. 9-14. The base of this imaginary triangular prism is placed along the bottom of a standard cuboid screw slot and then rotated a slight angle about the center point of the screw slot first in one direction, then the same amount in the opposite direction, the wedge-shaped areas of the prism passing through the imaginary walls of the cuboid slot. The areas where the volume of this imaginary triangular prism overlaps with the areas behind the ninety degree walls 26 of the standard slot are cut away, forming four dovetail undercut sections or facets 30 at opposite ends and opposite sides of the standard slot 20. The angle of rotation of this imaginary prism is great enough that in rotating, part of the top edges 29 of the standard screw slot 20 are cut away, flaring out the slot at both ends, as illustrated in FIGS. 3 and 8. The resulting four undercuts or facets 30 will have a four-sided, trapezoidal shape, the base 24 forming the bottom of the slot 20, the side farthest from the center point of the screw head being the side of the screw head, the upper side, parallel to the base at the bottom, being at the top edge of the screw slot, from a point at the top edge of the slot between the center point of the top edge and the extreme end of the slot, farthest from the center point, to a point at the bottom of the slot close to, but not at, the center point of the bottom edge of the screw slot. Between each pair of trapezoidal undercut facets 30 is a center section 28 that is non-undercut by the imaginary triangular prism, but will remain straight-sided such that it is normal or ninety degrees to the planar bottom surface 24 of the slot 20. The center sections are truncated, inverted isosceles triangles in configuration. The base of each triangular-shaped central portion 28 is formed by that part of the upper edge 27 of the slot 20 which is not flared. The tip of the truncated triangular central portion 28, where it meets the bottom of the slot, does not come to a point but rather is truncated, as shown in the figures.

When viewed from inside the slot 20, each slot wall 26 has two dovetailed facets 30 of trapezoidal shape at each end, as illustrated in FIG. 4. These dovetailed undercuts are cut deeper into the vertical slope of the ninety degree side walls 37, increasing in depth of cut across the trapezoid, from zero at the point nearest the center of the slot, to the maximum at the outer edge of the trapezoidal facet 30, which is the side of the screw head. The upper edge of each trapezoidal facet 30 is the flared edge 29 of the slot 20. This upper edge 29, with its associated angled planes, is the actual locking edge and surfaces of the slot. As described above, when viewed from inside, and as shown in FIG. 4, each slot wall 26 has a non-undercut central section 28 between the trapezoidal facets 30, which is a truncated, inverted isosceles triangle in shape. The base of the triangle is formed by the upper edge 27 of the slot 20 which is not flared.

With reference now to FIGS. 9-12, a driver bit 32 used in accordance with the present invention is illustrated. The driver bit 32 is specifically designed so as to engage the fasteners 10 illustrated and described above. The driver bit 32 includes a driver head 34 at an end thereof. A driver blade 36, which is configured to be inserted into the slot 20 of the fastener 10, extends from a top surface 38 of the driver head 34. Typically, the top surface 38 of the driver head 34 is generally planar, so as to engage the top surface 18 of the fastener head 14.

Figure 10:
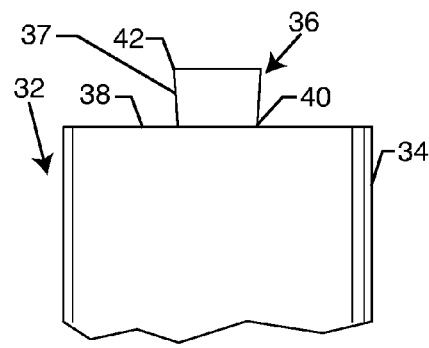
FIG. 10 is an end view of the driver bit of FIG. 9.
Figure 12:
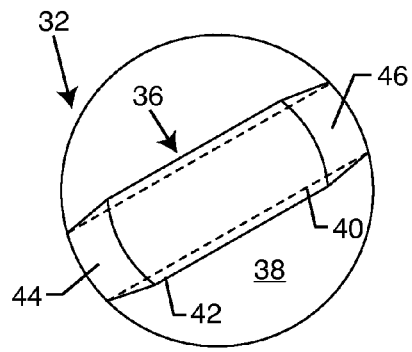
FIG. 12 is a top and diagrammatic view of the driver bit of FIG. 9.

With particular reference to FIGS. 10 and 12, the driver blade 36 is configured to be inserted into the insertion opening 22 of the slot 20 of the fastener 10, and engage its side walls 37 with the undercut faceted portions 30 of the fastener 10. As such, the portion 40 of the driver blade 36 which extends from the driver head 34 is of a narrower width than a free end or tip 42 of the driver blade 36. This is clearly illustrated in FIG. 10, wherein the driver blade 36 has a generally upside down trapezoidal or dovetail configuration. This is also illustrated in FIG. 12, wherein the dashed line represents the attached portion 40 of the driver blade 36 to the driver head 34, whereas the solid lines represent the free end or tip 42 of the driver blade 36. The width at the free end 42 and the width at the attached end 40 of the driver blade 36, as well as the configuration of the driver blade 36 is designed so as to match the configuration of the slot 20 of the fastener 10. As the slot 20 of the fastener 10 has a width at least along a portion of the base 24 thereof which is greater than the insertion opening 22, at least a portion of the free end or tip 42 of the driver blade 36 is of greater width than the attached end of the driver blade 40 as well, corresponding to dimension $D_2$ of FIG. 8. The height of the driver blade 36 is typically slightly less than the depth of the slot 20, such that there is a gap between the end of the driver blade 36 and the base of the slot, as illustrated in FIGS. 14 and 15.

Figure 9:
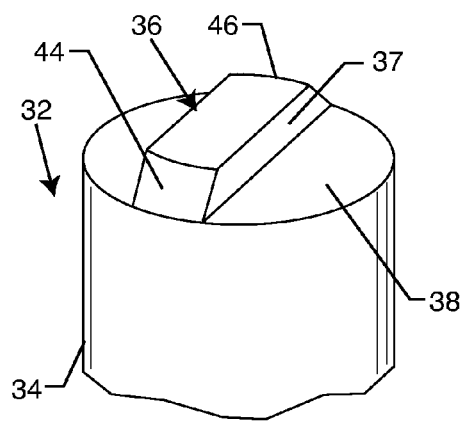
FIG. 9 is a partially fragmented and perspective view of a driver bit embodying the present invention.
Figure 11:
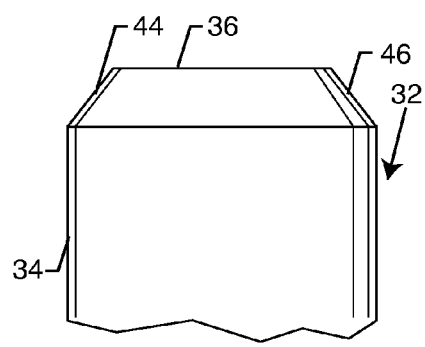
FIG. 11 is a side view of the driver bit of FIG. 9.

Preferably, the generally opposite ends 44 and 46 of the driver blade 36 have a configuration corresponding to at least a portion of the periphery of the fastener head 14. As illustrated in FIGS. 9, 11 and 12, these ends 44 and 46 are rounded or chamfered to match the coned portion of a common flat or cone head screw fastener, such as that illustrated in FIG. 2. This allows the fastener 10 to be fully driven or countersunk into the material, with the top surface 18 of the fastener head 14 countersunk at or below the level of the material. If the ends 44 and 46 were to extend beyond the periphery of the fastener head 14, they would dig into and damage the material as the fastener 10 was countersunk into the material.

Figure 13:
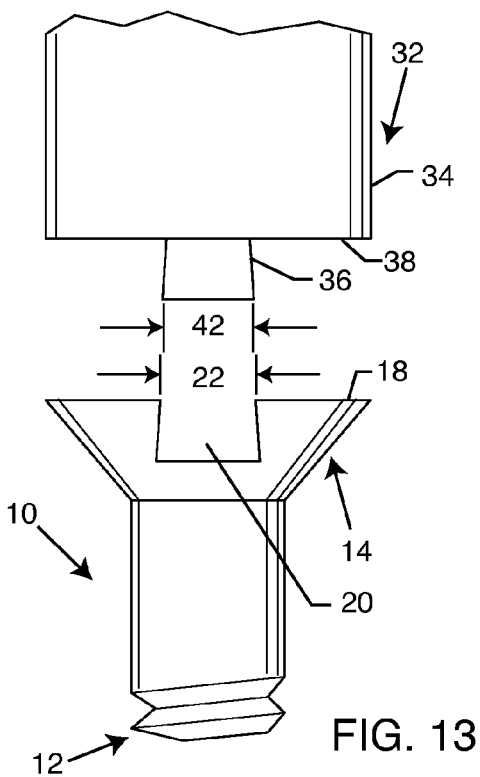
FIG. 13 is a side view illustrating the driver bit of FIG. 9 being aligned with a fastener head of a fastener embodying the present invention.
Figure 14:
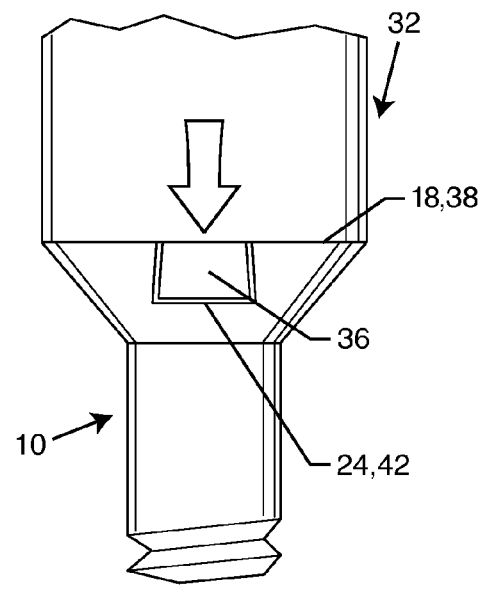
FIG. 14 is a side and diagrammatic view illustrating the insertion of the driving blade into the slot of the driver head of FIG. 13.

With reference now to FIGS. 13-16, in operation, the driver bit 32 is centered above the fastener 10 to be driven, as shown in FIG. 13, the driver blade 36 being indexed or aligned so that the driver blade 36 and the slot 20 are aligned, and the driver blade 36 can freely enter into the slot 20 from above, as the maximum width of the tip or free end 42 of the driver blade 36 is slightly less than the insertion opening 22 of the slot 20, as illustrated by the arrows in FIG. 13. The driver blade 36 enters into the slot 20 until the surface 38 of the driver head 34 contacts the upper surface 18 of the fastener 10, as illustrated in FIG. 14.

Figure 15:
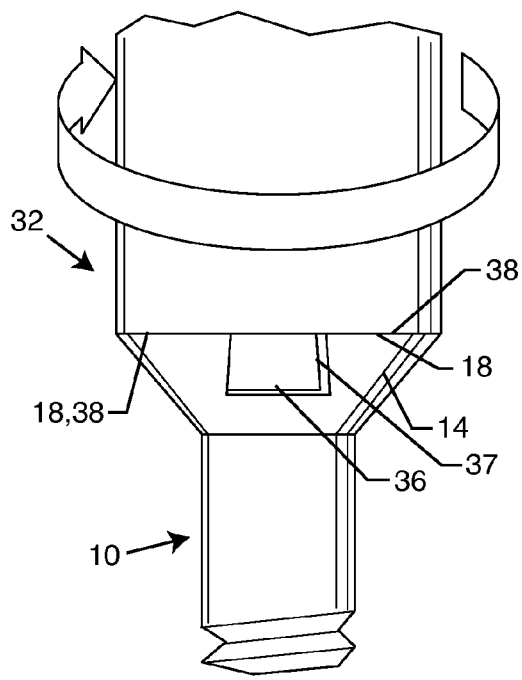
FIG. 15 is a side and diagrammatic view illustrating the driver bit under torque and in locked engagement with the fastener head of the fastener, in accordance with the present invention.

As can be seen in FIGS. 14 and 15, due to the fact that the surface 38 of the driver head 34 is in contact with the upper surface 18 of the fastener 10, and the height of the driver blade 36 from its free end or tip 42 to the base 40 where it joins the driver head 34 is less than the depth of the slot 20 from its upper surface 18 to the bottom of the slot 24, the blade 36 does not bottom out or contact the base 24 of the slot. Moreover, it will be noted in FIG. 14 that due to the fact that the driver blade 36 is of slightly smaller dimension than the slot 20 there is a slight amount of free space or give between the driver blade 36 and the base 24 and walls 26 of the slot.

Figure 16:
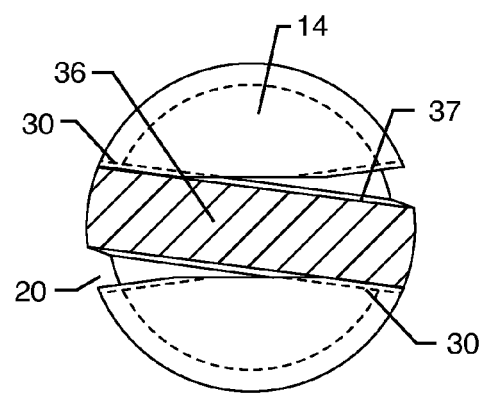
FIG. 16 is a top cross-sectional view illustrating engagement of surfaces of the driver blade and walls of the slot of the fastener, in accordance with the present invention.

With reference now to FIGS. 15 and 16, applying torque, as shown by the arrow in FIG. 15, to the driver bit 32 in either direction twists the driver bit 32 and driver blade 36 within the slot 20 slightly. The dovetailed angled side surfaces 37 of the driver blade 36 engage with and lock into the corresponding angled and undercut facets 30 of the slot 20 of the fastener head 14. This creates engagement between the driver blade 36 and approximately one-half of one wall 26 of the slot 20, and approximately one-half of a generally opposite end of the opposing wall 26 of the slot 20, as illustrated in FIG. 16.

While under torque, the driver bit 32 is securely locked to the fastener head 14 due to the action of the dovetail surfaces 37 of the driver blade 36 upon the corresponding angles of the facets 30 of the walls 26 of the slot 20. Due to the enlarged dimension of the free end or tip 42 of the driver blade 36 and the undercut facets 30, the driver blade 36, while under torque, is locked within the slot 20 of the fastener head 14.

Moreover, the generally planar surface 38 of the driver head 34 rests against the top surface 18 of the fastener head 14. The flat, planar surface 38 of the driver head 34, together with the angled dovetail side surfaces 37 of the driver blade 36 form two inverse wedges that capture and contain the corresponding web-shaped areas of metal formed by the top surface 18 of the screw head 14 and the dovetailed facets 30 of the screw slot 20 when turning force is applied. As the planar surface 38 of the driver head 34 is equal in diameter to the diameter of the screw head 14, the planar surface 38 comes into contact with the entire top surface 18 of the screw head 14, restricting the depth through which the driver blade 36 can enter the slot 20.

Thus, the driver bit 32 is designed to lock into the screw head 14 at the top of the slot 20, along the top edges 27 and 29 and the associated planes of the trapezoidal facets 30, rather than at the bottom of the slot, as in other fastener systems. Thus, the driver bit 32 is significantly engaged with the fastener head 14, and locked to the fastener head 14 when torque is applied thereto. Thus locked together, the fastener 10 can be driven into or removed from the material. As illustrated and described above, due to the fact that the fastener slot 20 is formed with a dovetail, due to the undercut facets 30 being formed at both ends of each wall 26, the fastener 10 can be locked to the driver bit 32 in either clockwise or counterclockwise directions, thus the driver bit 32 is locked to the fastener head 14 during insertion or removal of the fastener 10.

Figure 1:
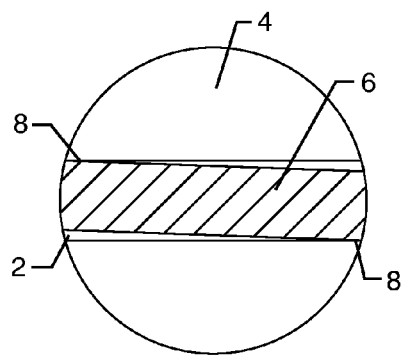
FIG. 1 is a top cross-sectional view of a prior art slotted fastener having a flat or regular screwdriver blade inserted therein.

This locking arrangement is shown in the top and cross-sectional view of FIG. 16. The driver blade 36 is shown in section through the plane at which it meets the driver head 34, at area 40, that is, on a plane congruent to the upper surface 18 of the screw head 14. As can be seen, the driver blade 36 twists slightly in the slot 20, making full contact along the entire surface of the dovetail facets 30 at generally opposite ends of the walls 26. This is in contrast to the cross-sectional view of FIG. 1 of a common straight slotted screw head, wherein the common straight-bladed screwdriver or bit 6 in a common straight screw slot 2, when twisted to drive the screw, the driver blade 36 makes contact only at the extreme ends of the blade 8. Moreover, as described above, such straight-bladed screwdriver heads or bits do not lock within the slot and are prone to cam out. The ability of the driver bit 32 to deliver turning force to the screw head 14 is not dependent upon the side walls 37 of the driver blade 36 bearing on the slot facets 30 alone. The planar surface 38 of the driver head 34 being held in tight contact with the upper surface 18 of the screw head 14 by the action of the angled surfaces 30 of the slot 20 on the driver blade 36 resists the deformation of the screw head under high torque forces. A top-locking system such as the present invention that captures and contains a screw head is a requirement for high-speed, high-torque power and automated tool screw driving. A strong locking system is needed to prevent disengagement at high rotational speeds. A driver head that resists screw deformation is required for high torque loads.

Figure 17:
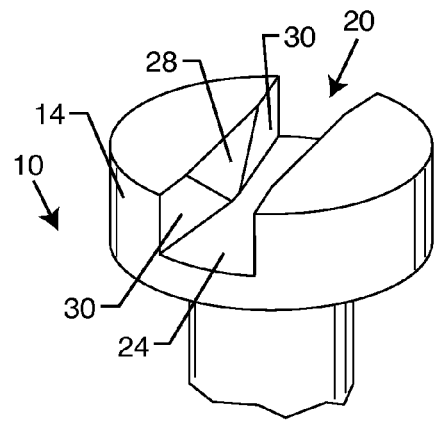
FIG. 17 is a partially fragmented perspective view of another fastener head type incorporating a faceted slot in accordance with the present invention.
Figure 18:
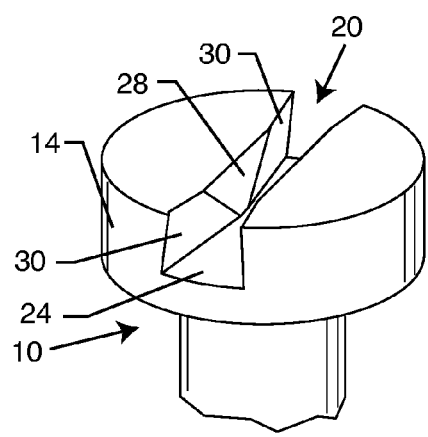
FIG. 18 is a fragmented perspective view similar to FIG. 17, but having a narrower slot.
Figure 19:
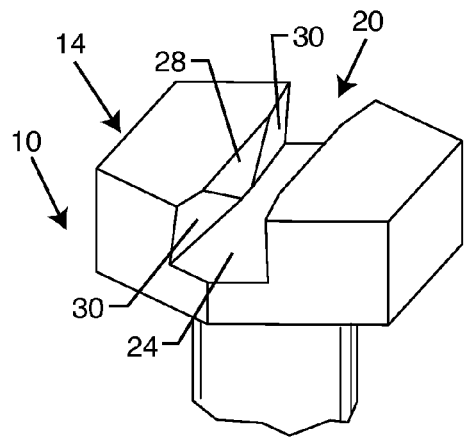
FIG. 19 is a fragmented perspective view of yet another fastener head type incorporating the faceted slot of the present invention.

FIGS. 17-20 illustrate alternate types of fastener heads to which the invention may be applied. The present invention can be incorporated into many different types of screw, bolt and other fastener heads. FIG. 17, for example, illustrates what is referred to as a pan head screw or bolt head. The faceted or undercut portions 30 are formed in both side walls, as previously described and as illustrated in FIG. 2. FIG. 18 is an illustration of a pan head screw similar to FIG. 17, but having a narrower slot 20 formed therein. FIG. 19 illustrates a hex-shape screw or bolt head having a faceted slot 20 embodying the present invention formed therein.

Figure 20:
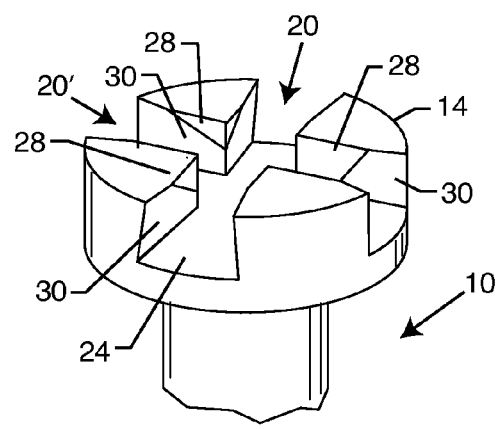
FIG. 20 is a fragmented perspective view of a fastener head having two slots of the present invention crossing one another.

With reference now to FIG. 20, a fastener 10 having a head with two slots 20 and 20' formed therein is shown. A first slot 20 is formed in the head 14, as shown and previously described herein. A second slot 20' is also formed in the head 14 in the same manner. When the slots 20 and 20' cross over one another, as illustrated, a cruciform-type or "x" slot configuration is formed.

Figure 21:
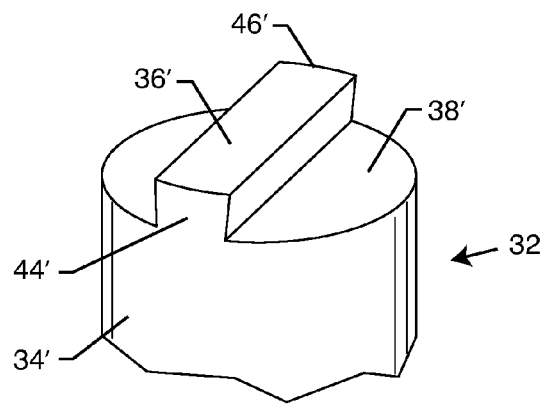
FIG. 21 is a partially fragmented perspective view of another driver bit embodying the present invention.

With reference now to FIG. 21, a driver bit 32' is shown wherein the driver blade 36', while having the inverse dovetail configuration such that the free end or tip thereof is of larger dimension than the portion extending from the surface of the driver head 34', has ends 44' and 46' which are flush with the periphery of the driver head 34', such that the length of the blade 36' is equal to the diameter of the planar surface 38'. Thus, the ends 44' and 46' correspond to at least a portion of the periphery of other fastener heads, such as those illustrated in FIGS. 17-20 which are not cone shaped.

Figure 22:
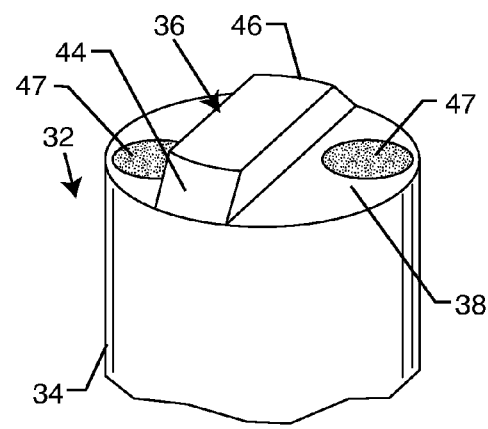
FIG. 22 is a partially fragmented perspective view of another driver bit having magnets embedded in the head thereof, in accordance with the present invention.

With reference now to FIG. 22, magnets 47 can be embedded into the driver head 34, such as being coplanar with the planar surface 38 of the driver head 34 so as to hold the metal screw or bolt fastener 10 firmly to the driver head 34 in a static condition, before turning torque is applied to the driver bit 32 to lock the screw head into place. The use of two magnets 47 on either side of the blade 36 provides greater lateral stability of the fastener than a single magnet. It will also be appreciated by those skilled in the art that a portion or the entirety of the driver head 34 may be magnetized to achieve the same result.

Figure 23:
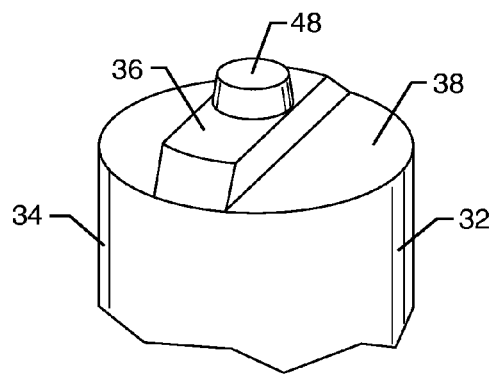
FIG. 23 is a fragmented perspective view of a driver bit having a projection extending from a driver blade thereof, in accordance with the present invention.
Figure 24:
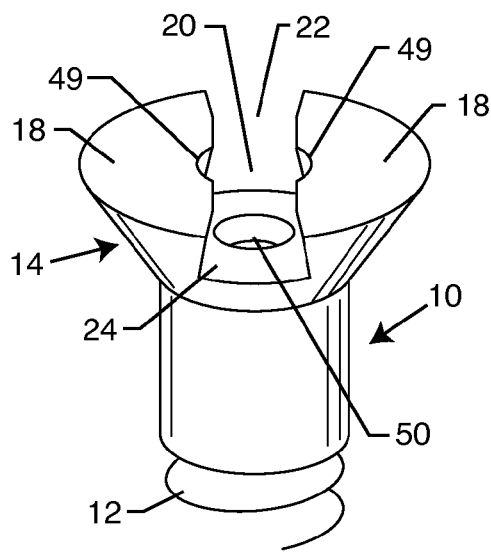
FIG. 24 is a side perspective view of a fastener embodying the present invention and having a recess for receiving the projection of the driver blade of FIG. 23.

With reference now to FIGS. 23 and 24, it is contemplated by the present invention that the driver blade 36 includes a projection 48 that is received through notches 49 formed in the walls 26 of the slot 20 and into a recess 50 of the fastener head 14. The recess 50, for example, could be formed in the base 24 of the slot and receive the projection 48 of the driver blade 36 when the driver blade 36 is inserted into the slot 20 of the fastener head 14. This arrangement can facilitate alignment and engagement between the driver bit 32 and the fastener 10.

Figure 25:
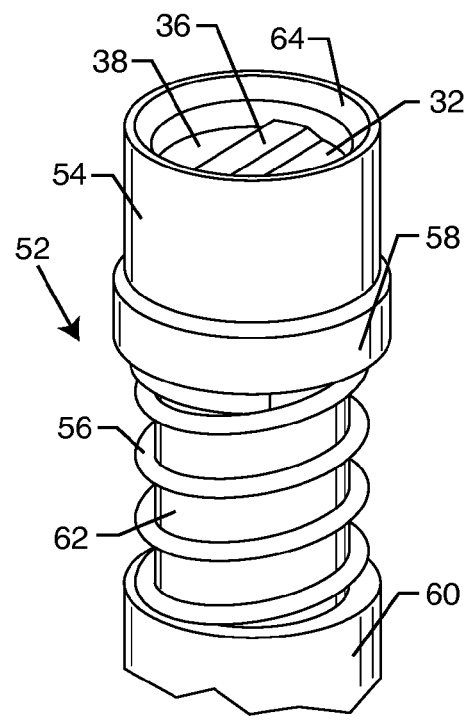
FIG. 25 is a perspective view of a guide and centering collar in an advanced position with respect to an associated driver bit.
Figure 26:
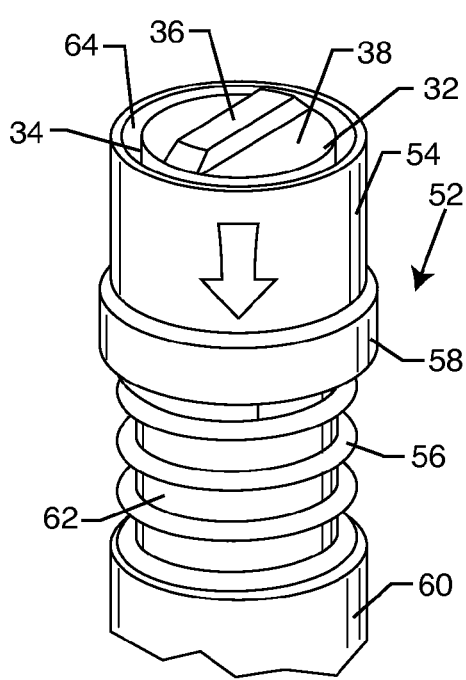
FIG. 26 is a perspective view similar to FIG. 25, with the collar of the guide in a retracted position.

An assembly 52, such as illustrated in FIGS. 25 and 26, can also be used to center and align the driver head 34 with the fastener head 14, such that the driver blade 36 can be inserted into the fastener slot 20. The assembly 52 includes an open-ended collar 54 which slidably receives the driver head 34 and serves as a guide. The collar 54 is biased by spring 56 to an advanced or outward position, illustrated in FIG. 25. The spring 56 is disposed between ledge 58 and a removable collar, retaining ring or circlip 60. Ledge 58 is generally an extension or ring about the end of collar 54, and in fact can comprise the bottom end of collar 54. Reference numeral 62 indicates an extension of the driver head 34. While collar 54 moves independent from the driver bit 32 from a biased advance position to a retracted position, shown in FIG. 26, the driver head 34 and 62 of the driver bit 32 advances and retracts as the attached fastener is being installed or removed as the driver head 34 and extension 62 are formed together. It will be appreciated that the assembly 52 may be part of or attached to a manual or powered tool for applying torque to the driver bit 32.

The collar 54 may include a slight chamfer 64 on an upper lip or edge thereof which facilitates positioning the collar 54 directly over the fastener head, not shown. When the fastener head is perfectly centered on the driver head 34 under the aligning influence of the collar 54, the driver bit 32 can be turned at a slow speed until the driver blade 36 drops into the fastener slot 20, after which the fastener can be driven at full speed.

When the driver head 34 and centering collar 54 near the end of their stroke, with the attached fastener nearing its full depth in the material (not shown), the upper surface of the centering collar contacts the surface of the material into which the fastener is being driven into and begins to be forced back or retracted against the bias of spring 56. This is the point at which the cone or flat head screw fastener is fully driven into the material and the screw head is flush with the surface of the material into which it is driven. Thus, by retracting, the centering collar 54 will not interfere with or dig into the material when driving a cone or flat head screw to countersunk depth or somewhat deeper. The collar 54 can also be manually retracted by grasping the ledge or ring 58 formed around the lower or rear outer diameter of the centering collar for this purpose.

It can be appreciated that as the collar 54 is forced back as the fastener is being driven deeper into the material, at some point the spring 56 will be fully compressed, the point at which the coils of the spring come into contact with each other, and the spring can be compressed no more. At this point, the collar 54 will retract no more. Thus, as the driver head 34 continues rotating and the screw head 14 is driven still deeper, the force of the now non-retracting collar upon the surface of the material will prohibit the driver bit 32 and driver head 34 from advancing further along the screw. The driver head is still free to turn, however, driving the screw head still deeper as long as the driver blade 36 can maintain contact with the facets 30 of the screw slot 20. But as the screw head 14 is driven deeper, the still turning driver blade 36 will gradually lift from and retract from the screw slot 20. Eventually, the driver blade 36 will lift to the point that it slips entirely out of the screw slot 20, becoming completely free of engagement with the screw slot 20. At this point, even though the driver head 34 and blade 36 are still turning, the screw will no longer be driven further.

Thus, the collar mechanism can be used as a depth limiting feature as well. In addition, by fitting the shaft 60 with an adjustable collar that can be advanced or retracted in a forward or backward manner, such that the compressed length of the spring 56 can be varied, the collar mechanism shown in FIGS. 25 and 26 can be used as an adjustable depth-limiting feature for driving screws, such that the screw can be driven to an exact countersunk depth, or somewhat more or less than the countersunk depth. In addition, the collar fitting 60 to shaft 62 can be formed with a suitable extension that makes direct contact with collar 54 and be adjustable to control screw depth in a similar manner, without utilizing the full compression of the spring 56.

It will be appreciated by those skilled in the art that the driver head 34 may need to be rotated up to nearly one hundred eighty degrees in or for the driver blade 36 thereof to align with the slot 20 of the fastener head 14. However, when two slots are formed in the fastener head 14, such as illustrated in FIG. 20, in that the slots are at right angles to one another and cross over one another to form an "x" in the top of the fastener head 14, the driver blade 36 need only be rotated a maximum of ninety degrees in order for one of the two slots 20 and 20' to align with the driver blade 36 such that the driver blade 36 will enter into a slot 20 or 20'.

With reference now to FIGS. 27-30, a driving tool 66 used in accordance with the present invention and having a clutching and de-clutching mechanism is shown. When the driver head 34 of the present invention is combined with a simple clutching and de-clutching mechanism, the independent motion of the driver head can be used to drive a fastener to an exact required depth. Such can be useful, for example, in automatic-feed tool systems, wherein a supply of fasteners is fed automatically into the tool from a continuous strip or magazine and held or moved into a ready-to-drive position as indicated by the fastener 10 in FIG. 27. Such automatic-feed tool systems typically include feed lips or fingers for positioning the fastener 10 in the desired location and orientation. Of course, a tool 66 having a clutching and de-clutching mechanism such as that illustrated in FIGS. 27 and 30 need not necessarily be limited to use in automatic-feed tool systems, but instead can be incorporated in manual or powered drive tools and systems as well.

Due to the fact that the driver blade 36 of the driver head 34 locks into engagement with the slot 20 of the fastener head 14 when torque is applied thereto, the driver head 34 can move independently from the other parts of a powered tool and still drive or remove a fastener 10 from material. As mentioned above, when combined with a clutching and de-clutching mechanism, this independent motion of the driver bit 32 can be used to drive a fastener 10 to an exact required depth. Moreover, due to this locking engagement, downward forces, or forces aligned with the travel of the fastener 10, are not necessary. Instead, as the driver head 34 and fastener 10 are locked in engagement with another when torque is applied thereto high speed and high torque instead is sufficient to drive and remove such fasteners.

With reference now to FIG. 27, fastener 10 is shown already engaged with driver head 34 and in position so as to be inserted into material 68. The driver bit 32 includes an elongated generally cylindrical driver head 34 which is placed inside of a corresponding generally cylindrical hollow tube 70 having a slightly larger internal diameter than the outer diameter of the driver head 34. The driver head 34 is free to slidably move up and down a distance in the tube 70, its stroke limited by a stop 72, shown in the form of a threaded rod entering from the opposite end of the tube 70 and acting upon and limiting the travel of a plunger head 74 attached to a plunger shaft 76 which is an extension of the driver head 34. A spring 78 disposed between the plunger head 74 and a platform, such as a retaining clip 80 biases the plunger head 74, and thus the driver head 34 into the tube 70 and towards the stop 72. As can be seen in FIG. 30, the retaining clip 80, which serves as a stop for plunger head 74, has a passageway formed therethrough to permit passage of the plunger shaft 76. The plunger shaft 76 and attached driver head 34 are maintained in the initial or at-rest position shown in FIG. 27 by the force of coil spring 78. The coil spring 78 can be a very light force, only the minimum force required to retain the driver head 34 in the at-rest position shown in FIG. 27.

Before the tool 66 is put into use, the operator of the tool 66 can turn the threaded rod stop 72 by any convenient mechanical means, not shown, to advance the initial or at-rest position of the plunger head 74, and thus the attached driver head 34 within the hollow driving tube 70 to adapt the stroke of the driver head 34 to fasteners shorter in length than the one illustrated. Conversely, the tool 66 can accommodate fasteners 10 of a greater length by retracting the threaded stop 72.

With reference to FIGS. 28 and 29, the hollow driving tube 70 includes grooves 82 inside its internal diameter in which the driver head 34 rests. FIG. 28 illustrates four such grooves 82 formed parallel to the major axis of the hollow driving tube 70. Corresponding elongated splines in the form of narrow ridges 84 are formed along a length of the driver head 34. The splines 84 fit within the grooves 82. The grooves 82 and splines 84 of the hollow driving tube 70 and the driver head 34 are arranged such that when the hollow driving tube 70 is turned, the splines 84 and grooves 82 will lock, transmitting the turning motion of the hollow driving tube 70 to the driver head 34. The turning motion and torque is supplied to the hollow driving tube 70 by an electric, pneumatic, or otherwise powered motor connected to the hollow driving tube 70, which is not shown, but can be of any convenient arrangement.

Once the fastener 10 has been indexed to the driver blade 36, with the driver blade dropping to the full depth in the slot 20, as shown in FIG. 27, the framework of the tool 66, not shown, maintains the hollow driving tube 70 at a constant distance from the material 68. When turning motion or torque is applied to the hollow driving tube 70, it communicates its motion through the interlocking grooves 82 and splines 84 to the driver head 34 and the attached driver blade 36, which locks into the head of the fastener 14, and turns the fastener 10, advancing the fastener 10 into the material 68 due to its spiral screw thread 12.

Because the driver blade 36 is locked into the fastener head 14, when turning torque is applied, and because the driver head 34 is free to move up and down the hollow driving tube 70, the splines 84 of the driver head 34 sliding along the grooves 82 of the hollow driving tube 70, the driver head 34 will advance along with the fastener 10, following the fastener 10 down towards the surface of the material 68, its motion independent from the hollow driving tube 70. This enables the hollow driving tube 70, and thus the tool 66 to maintain a constant distance from the material 68, even as the fastener 10 is advanced and driven into the material 68.

With reference now to FIG. 30, at the precise moment in which the driver bit 34 reaches the end of its stroke, with the fastener 10 driven to its required depth into the material, the splines 84 of the driver head 34 have extended out past the ends or tips 86 of the corresponding grooves 82 of the hollow driving tube 70, at which point the driver head 34 will stop turning as its splines 84 are no longer engaged with the grooves 82 of the driving tube 70. The grooved driving tube 70 can continue to turn, but will not exert any torque or turning force upon the driver head 34 once the driver head 34 has extended beyond the grooved portion of the tube 70. This will correspond with the predetermined depth of the fastener 10. As illustrated in FIG. 30, the fastener 10 is of a flat or cone-shaped head variety which is intended to be countersunk or placed flush with the material 68, as illustrated in FIG. 30. However, fasteners of other head shapes, such as pan heads, as shown in FIG. 17, hex heads, as shown in FIG. 19, or other shaped heads can also be driven to an exact predetermined depth with this tool.

With the removal of the torque and turning motion from the grooved driving tube 70, the driver blade 36 is not forced into locked engagement with the facets and undercuts 30 of the slot 20 of the fastener head 14. Thus, the driver head 34, under the influence of the bias of the spring 78, retracts back into the tube 70. The elongated splines 84 will engage and nest with the corresponding grooved portions 82 of the tube 70. The ends 86 of the splines 84 may be angled to facilitate the retraction of the splines 84 back into the grooves 82 of the tube 70. The driver bit 32 will instantly snap back under the action of the plunger head 74 and spring 78, returning to the at-rest position shown in FIG. 27. The angled ends 86 of the splines 84 of the driver bit 32 assist in allowing the free retraction of the driver head 34 as it snaps back into the hollow driving tube 70, permitting the ends of the splines and ridges of the hollow tube 70 from hanging up upon each other and preventing the driver head 34 from retracting within the hollow driving tube 70.

FIGS. 27-30 illustrate one tool 66 having a clutching and de-clutching mechanism acting upon the driver head 34. It will be appreciated that clutching and de-clutching can also be achieved by other mechanical means, including, but not limited to, electric, electronic, pneumatic or other common clutching and de-clutching mechanisms.

Although several embodiments have been described in detail for purposes of illustration, various modifications may be made without departing from the scope and spirit of the invention. Accordingly, the invention is not to be limited, except as by the appended claims.

What is claimed is:

1. A fastener, comprising:
a first end defining a threaded portion;
a second end including a fastener head;
a slot formed in the head, the slot including generally opposed first and second walls defining an insertion opening;
the first wall having two faceted portions each having angles of less than ninety degrees with respect to the base of the slot, the two faceted portions being separated by a generally perpendicular central portion relative to the base of the slot; and
the second wall having two faceted portions each having angles of less than ninety degrees with respect to the base of the slot, the two faceted portions being separated by a generally perpendicular central portion relative to the base of the slot;
wherein a central portion of a top edge of the first wall and a central portion of a top edge of the second wall are generally parallel to one another, and wherein a top edge of the first wall and a top edge of the second wall at each end of the slot defined by the faceted portions diverge away from one another; and
wherein the base of the slot has a variable width, at least a portion of the width of the base being greater than the width of the insertion opening.

2. The fastener of claim 1, wherein a generally dovetail cross-sectional configuration is formed at each end of the slot.

3. The fastener of claim 1, wherein each of the faceted portions of the first and second walls has a generally trapezoidal configuration.

4. The fastener of claim 1, wherein each of the central portions of the first and second walls has a generally truncated triangular configuration.

5. A fastener, comprising:
a first end defining a threaded portion;
a second end including fastener head;
a slot formed in the head, the slot including generally opposed first and second walls defining an insertion opening;
the first wall having two faceted portions each having angles of less than ninety degrees with respect to the base of the slot, the two faceted portions being separated by a generally perpendicular central portion relative to the base of the slot; and
the second wall having two faceted portions each having angles of less than ninety degrees with respect to the base of the slot, the two faceted portions being separated by a generally perpendicular central portion relative to the base of the slot; and
a second slot formed in the head of the fastener.

6. The fastener of claim 5, wherein the first and second slots cross one another.

7. A fastener system, comprising:
a fastener including a first end defining a threaded portion, a second end including a fastener head, a slot formed in the head, the slot including generally opposed first and second walls defining an insertion opening, the first wall having two faceted portions each having angles of less than ninety degrees with respect to the base of the slot, the two faceted portions being separated by a generally perpendicular central portion relative to the base of the slot, and the second wall having two faceted portions each having angles of less than ninety degrees with respect to the base of the slot, the two faceted portions being separated by a generally perpendicular central portion relative to the base of the slot, wherein each of the faceted portions of the first and second walls has a generally trapezoidal configuration; and a driver bit including a driver head having a generally planar surface and a blade configured to be inserted into the slot of the fastener extending from the planar surface of the driver head to a free end, at least a portion of the free end of the blade having a width greater than the width of the blade at the driver head planar surface;

wherein the blade is locked within the slot when torque is applied to the driver bit.

8. The fastener system of claim 7, wherein the base of the slot of the fastener has a variable width.

9. The fastener system of claim 7, wherein a generally dovetail cross-sectional configuration is formed at each end of the slot.

10. The fastener system of claim 7, including a second slot formed in the head of the fastener.

11. The fastener system of claim 10, wherein the first and second slots cross one another.

12. The fastener system of claim 7, wherein each of the central portions of the first and second walls has a generally truncated triangular configuration.

13. The fastener system of claim 7, wherein a central portion of a top edge of the first wall and a central portion of a top edge of the second wall are generally parallel to one another, and wherein a top edge of the first wall and a top edge of the second wall at each end of the slot defined by the faceted portions diverge away from one another.

14. The fastener system of claim 7, including a projection extending from the blade configured for insertion into a recess formed in the head of the fastener.

15. The fastener system of claim 7, wherein generally opposite ends of the driver blade have a configuration corresponding to at least a portion of a periphery of the fastener head.

16. The fastener system of claim 7, wherein the driver head includes a magnet embedded therein.

17. The fastener system of claim 7, wherein the driver bit is associated with a guide assembly, including a collar which moves independent of the driver bit from a biased advanced position to a retracted position.

18. A fastener system, comprising:
a fastener including a first end defining a threaded portion, a second end including a fastener head, a slot formed in the head, the slot including generally opposed first and second walls defining an insertion opening, the first wall having two faceted portions each having angles of less than ninety degrees with resect to the base of the slot, the two faceted portions being separated by a generally perpendicular central portion relative to the base of the slot, and the second wall having two faceted portions each having angles of less than ninety degrees with respect to the base of the slot, the two faceted portions being separated by a generally perpendicular central portion relative to the base of the slot; and
a driver bit associated with a clutching and de-clutching mechanism, including a driver head having a generally planar surface and a blade configured to be inserted into the slot of the fastener extending from the planar surface of the driver head to a free end, at least a portion of the free end of the blade having a width greater than the width of the blade at the driver head planar surface;
wherein the blade is locked within the slot when torque is applied to the driver bit.

19. The fastener system of claim 18, wherein the driver bit includes an elongated spline extending along less than a length of the driver bit, the spline being engaged with a groove of a tube of the clutching and de-clutching mechanism during a length of travel of the driver bit relative to the tube, and the spline being disengaged from the groove beyond the length of travel of the driver bit relative to the tube.

20. The fastener system of claim 19, wherein the driver bit further includes a plunger generally opposite the blade under spring tension to bias the driver bit within the tube.

21. The fastener system of claim 19, including means for limiting the travel of the driver bit relative to the tube.

22. The fastener system of claim 19, wherein the spline disengages from the groove at a length of travel of the driver bit corresponding to a length of the fastener.

23. A fastener system, comprising;
a fastener including a first end defining a threaded portion, a second end including a fastener head, a slot formed in the head, the slot including generally opposed first and second walls defining an insertion opening, the first wall having two faceted portions each having angles of less than ninety degrees with respect to the base of the slot, the two faceted portions being separated by a generally perpendicular central portion relative to the base of the slot, and the second wall having two faceted portions each having angels of less than ninety degrees with respect to the base of the slot, the two faceted portions being separated by a generally perpendicular central portion relative to the base of the slot; and
a driver bit including a driver head having a generally planar surface and a blade configured to be inserted into the slot of the fastener extending from the planar surface of the driver head to a free end, at least a portion of the free end of the blade having a width greater than the width of the blade at the driver head planar surface;
wherein the blade is locked within the slot when torque is applied to the driver bit; and
wherein the height of the driver blade is less than the depth of the screw slot.

24. A fastener, comprising:
a first end defining a threaded portion;
a second end including a fastener head;
a slot formed in the head, the slot including generally opposed first and second walls defining an insertion opening;
the first wall having two faceted portions each having angles of less than ninety degrees with respect to the base of the slot, the two faceted portions being separated by a generally perpendicular central portion relative to the base of the slot; and
the second wall having two faceted portions each having angles of less than ninety degrees with respect to the base of the slot, the two faceted portions being separated by a generally perpendicular central portion relative to the base of the slot;
wherein the base of the slot has a variable width, at least a portion of the width of the base being greater than the width of the insertion opening;
wherein a generally dovetail cross-sectional configuration is formed at each end of the slot;
wherein each of the faceted portions of the first and second walls has a generally trapezoidal configuration;
wherein each of the central portions of the first and second walls has a generally truncated triangular configuration; and
wherein a central portion of a top edge of the first wall and a central portion of a top edge of the second wall are generally parallel to one another, and wherein a top edge of the first wall and a top edge of the second wall at each end of the slot defined by the faceted portions diverge away from one another.

* * * * *

UNITED STATES PATENT AND TRADEMARK OFFICE
CERTIFICATE OF CORRECTION

| | | |
|---|---|---|
| PATENT NO. | : 8,881,625 B2 | Page 1 of 1 |
| APPLICATION NO. | : 13/311246 | |
| DATED | : November 11, 2014 | |
| INVENTOR(S) | : Robert Jenkins | |

It is certified that error appears in the above-identified patent and that said Letters Patent is hereby corrected as shown below:

In the Claims

In column 14, line 19 (claim 1), replace "wail" with --wall--.

In column 14, line 35 (claim 5), insert --a-- between "including" and "fastener".

In column 15, line 46 (claim 18), replace "resect" with --respect--.

In column 16, line 21 (claim 23), replace "angels" with --angles--.

Signed and Sealed this
Tenth Day of March, 2015

Michelle K. Lee
*Deputy Director of the United States Patent and Trademark Office*